United States Patent
Lee et al.

(10) Patent No.: US 8,341,338 B2
(45) Date of Patent: Dec. 25, 2012

(54) DATA STORAGE DEVICE AND RELATED METHOD OF OPERATION

(75) Inventors: Jin-Hyuk Lee, Seoul (KR); Jang hwan Kim, Suwon-si (KR); Han-Chan Jo, Yongin-si (KR); Yeong-Jae Woo, Guri-si (KR); Dong hyun Song, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 218 days.

(21) Appl. No.: 12/772,452

(22) Filed: May 3, 2010

(65) Prior Publication Data
US 2010/0287333 A1    Nov. 11, 2010

(30) Foreign Application Priority Data

May 6, 2009  (KR) .................... 10-2009-0039376
May 27, 2009 (KR) .................... 10-2009-0046575

(51) Int. Cl.
G06F 13/00 (2006.01)
G06F 12/00 (2006.01)
G06F 3/00 (2006.01)
G06F 5/00 (2006.01)

(52) U.S. Cl. . 711/103; 711/118; 711/154; 711/E12.002; 710/52

(58) Field of Classification Search ............... 711/103, 711/118, 154, E12.002; 710/52
See application file for complete search history.

(56) References Cited

U.S. PATENT DOCUMENTS

| | | | |
|---|---|---|---|
| 5,603,001 A | 2/1997 | Sukegawa et al. | |
| 6,728,826 B2 | 4/2004 | Kaki et al. | |
| 7,173,863 B2 | 2/2007 | Conley et al. | |
| 2005/0125614 A1* | 6/2005 | Royer | ............ 711/137 |
| 2006/0152981 A1 | 7/2006 | Ryu | |
| 2010/0174851 A1* | 7/2010 | Leibowitz et al. | ............ 711/103 |

FOREIGN PATENT DOCUMENTS

| | | |
|---|---|---|
| JP | 07302176 A | 11/1995 |
| JP | 2003173295 A | 6/2003 |
| JP | 2006195990 A | 7/2006 |
| JP | 2007528079 A | 10/2007 |
| JP | 2008108281 A | 5/2008 |
| KR | 1019940001166 | 1/1994 |
| KR | 1020060081928 A | 7/2006 |
| KR | 1020060108707 A | 10/2006 |
| KR | 1020070022659 A | 2/2007 |
| WO | 2005088456 A3 | 9/2005 |

* cited by examiner

Primary Examiner — Edward Dudek, Jr.
(74) Attorney, Agent, or Firm — Volentine & Whitt, PLLC

(57) ABSTRACT

A data storage device comprises a plurality of memory devices, a buffer memory, and a controller. The plurality of memory devices are connected to a plurality of channels and a plurality of ways. The buffer memory temporarily stores data to be written in the memory devices. The controller stores the data in the buffer memory based on channel and way information of the memory devices.

23 Claims, 14 Drawing Sheets

DATA STORAGE DEVICE AND RELATED METHOD OF OPERATION

CROSS-REFERENCE TO RELATED APPLICATIONS

This application claims priority under 35 U.S.C. §119 to Korean Patent Application No. 10-2009-0046575 filed on May 27, 2009, and Korean Patent Application No. 10-2009-0039376 filed on May 6, 2009, the respective disclosures of which are hereby incorporated by reference in their entirety.

BACKGROUND

Embodiments of the inventive concept relate generally to data storage devices. More particularly, embodiments of the inventive concept relate to data storage devices using a semiconductor device for main storage, and methods of operating the data storage devices.

Recent years have been marked by a continual increase in the demand for digital storage media. To address this increasing demand, researchers have developed and refined data storage devices of various types, each providing advantages and/or drawbacks compared with the others.

Hard disk drives (HDDs), for instance, tend to have relatively high storage density, high data transmission speed, fast data access time, and low cost. But they also tend to suffer from mechanical defects and high power consumption on account of their numerous moving parts.

Due to these and other shortcomings of HDDs, there is an ongoing trend to replace HDDs with solid state disks (SSDs) incorporating nonvolatile memories such as flash memories. These SSDs generally have fewer moving parts than HDDs, and therefore they tend to have fewer mechanical defects and lower power consumption. In addition, the reduction of moving parts can reduce latency and mechanical drive time compared with HDDs, allowing SSDs in some instances to execute read and write operations more quickly than HDDs. Moreover, SSDs can also reduce errors caused by latency and mechanical friction, improving reliability of read and write operations. Finally, SSDs tend to produce less heat and noise than HDDs and are largely resistant to external impact, making them attractive for portable devices.

SUMMARY

Embodiments of the inventive concept provide a data storage device using semiconductor memories for main storage, and methods of operations the data storage device. Certain embodiments improved efficiency relative to conventional data storage devices.

According to one embodiment of the inventive concept, a data storage device comprises a plurality of memory devices connected to a plurality of channels and a plurality of ways, a buffer memory that temporarily stores data to be written in the plurality of memory devices, and a controller that stores the data in the buffer memory in a configuration determined by the connections between the channels and ways and the plurality of memory devices. The buffer memory comprises a plurality of sectors corresponding to a plurality of volumes and a plurality of sectors, and wherein the respective volumes correspond to respective channels and respective banks correspond to respective ways.

In certain embodiments, the controller determines a volume and a bank of the buffer memory that correspond to a logical address of the data, and stores the data in a sector of the buffer memory corresponding to the determined volume and bank.

In certain embodiments, a logical address of each of the sectors corresponds to a cache line of one of the volumes and one of the banks.

In certain embodiments, the controller stores the cache line and mapping information of a volume and a bank corresponding to the cache line.

In certain embodiments, the plurality of channels comprise N channels and the plurality of ways comprise M ways, wherein logical addresses of the buffer memory correspond to a plurality of cache ways, and wherein each of the cache ways comprises N×M cache lines corresponding to N volumes and M banks.

In certain embodiments, the controller controls data corresponding to at least one cache way to be stored in the plurality of memory devices.

In certain embodiments, the controller registers a write operation for write data stored in a sector corresponding to the cache line in a corresponding one of the plurality of memory devices in a job unit. In certain embodiments, the controller queues the registered write operation with other job units to form a job unit plate. In certain embodiments, the N channels and the M ways are connected to the memory devices, and the job unit plate comprises N×M job units corresponding to the N volumes and the M banks In certain embodiments, the controller executes write operations on the plurality of memory devices in a unit comprising at least one job unit plate. In certain embodiments, each of the job units is queued in a location of the job unit plate based on a corresponding volume and bank.

In certain embodiments, the controller stacks a plurality of job units corresponding to the same volume and bank in the same location in different job unit plates for queuing operations. In certain embodiments, the controller comprises a buffer memory control unit controlling write and read operations of the plurality of memory devices and further controlling the buffer memory, based on channel and way information of the plurality of memory devices.

In certain embodiments, the buffer memory control unit comprises a buffer manager that manages locations where the data is stored in the buffer memory based on the channels and the ways, and a scheduler that schedules timing for transferring the data stored in the buffer memory into the plurality of memory devices.

In certain embodiments, the plurality of memory devices are flash memory devices.

According to another embodiment of the inventive concept, a method is provided for storing data in a data storage device. The method comprises requesting a cache line of a buffer memory in response to a write command received from a host, temporarily storing data in a free cache line upon determining that the free cache line exists in the buffer memory, selecting a victim cache line and performing a flush operation on the victim cache line upon determining that no free cache line exists in the buffer memory, defining a job unit corresponding to data from the flushed cache line, queuing a plurality of job units to form a job unit plate having a data arrangement based on volume and bank information of the plurality of job units, and performing a plurality of write operations in a plurality of memory devices connected to a plurality of channels and ways, the plurality of write operations corresponding to plurality of job units in the job unit plate.

In certain embodiments, the method further comprises performing a subset of the plurality of write operations in parallel in the plurality of channels.

In certain embodiments, the plurality of channels correspond to a plurality of volumes of the buffer memory, and the plurality of ways correspond to a plurality of banks of the buffer memory.

According to one embodiment of the inventive concept, a method is provided for performing a plurality of read commands in each of a plurality of channels included in a data storage device. The method comprises determining whether a data sensing operation corresponding to a first read command has been previously performed, sensing data from a first memory based on the first read command upon determining that the data sensing operation has not been previously performed, determining whether a second read command to be executed after the first read command is queued in a buffer memory, sensing data from a second memory based on the second read command upon determining that the second read command is not queued in the buffer memory, and transmitting the data sensed from the first memory, to a memory device while sensing the data from the second memory.

In certain embodiments, the first and second read commands are executed in different flash memories connected to different channels of the data storage device.

BRIEF DESCRIPTION OF THE DRAWINGS

Embodiments of the inventive concept are described below with reference to the accompanying drawings. In the drawings, like reference numbers denote like features.

DETAILED DESCRIPTION OF THE EMBODIMENTS

Embodiments of the inventive concept are described below with reference to the accompanying drawings. The described embodiments are provided as teaching examples and should not be construed to limit the scope of the inventive concept.

In certain embodiments, a data storage device such as an SSD uses a collection of flash memories as a main storage medium. The data storage device stores data in a buffer memory based on the configuration of channels and ways connected to the flash memories. The data storage device schedules memory access operations requested by a host so that data stored in the buffer memory is distributed to and stored in the flash memories via the channels and ways. As a result, the channel usage and data storage performance of the data storage device can be improved.

Figure 1:
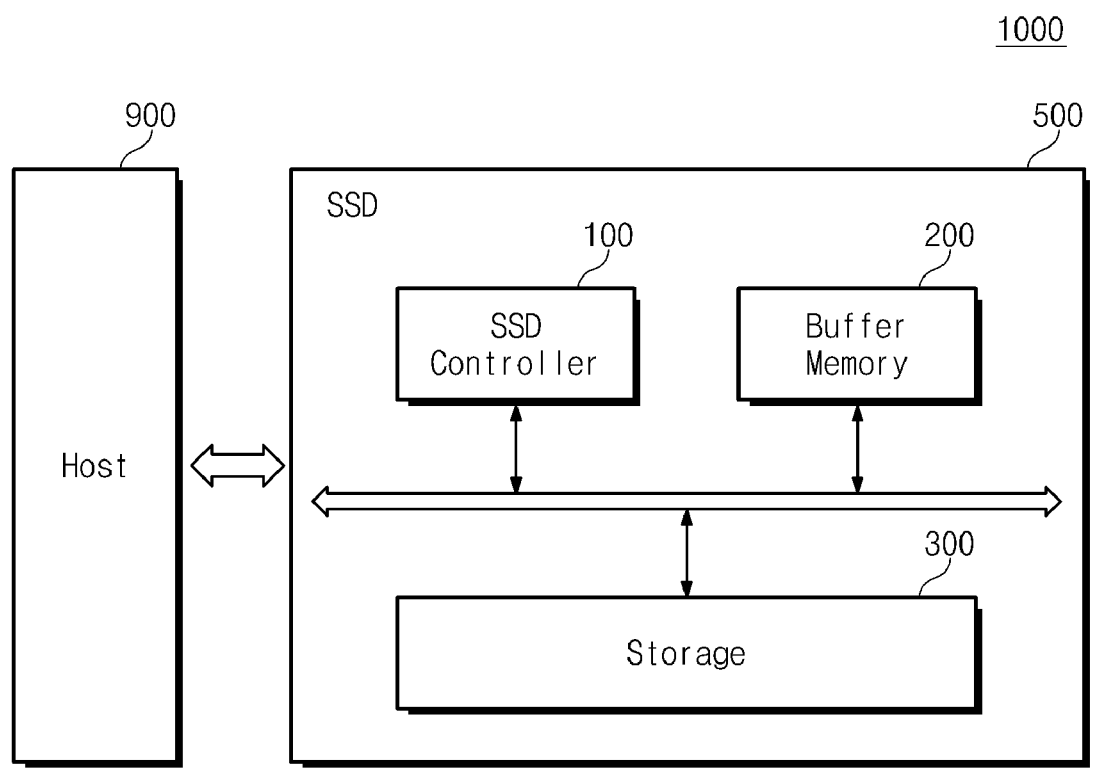
FIG. 1 is a block diagram illustrating a memory system comprising an SSD according to an embodiment of the inventive concept.

FIG. 1 is a block diagram illustrating a memory system 1000 comprising an SSD 500 according to an embodiment of the inventive concept. SSD 500 is provided as one example of a data storage device, and other embodiments can use other types of memory storage devices.

Referring to FIG. 1, memory system 1000 comprises SSD 500 and a host 900. SSD 500 comprises an SSD controller 100, a buffer memory 200, and a storage medium 300.

Buffer memory 200 temporarily stores data transmitted between SSD controller 100 and storage medium 300, and data transmitted between SSD controller 100 and host 900. SSD controller 100 controls operations for reading and writing data in buffer memory 200. Buffer memory 200 can be located either inside or outside SSD controller 100. Buffer memory 200 typically comprises a random access memory, such as a dynamic random access memory (DRAM) or static random access memory (SRAM).

Storage medium 300 provides main data storage for SSD 500. Storage medium 300 stores data in semiconductor memory chips and typically comprises a volatile or nonvolatile memory. In certain embodiments described below, SSD controller 100 and storage medium 300 are connected to each other by "N" channels, where each channel comprises "M" ways. The term "way" here denotes a data transmission pathway capable of providing interleaved access to a data channel. For instance, a channel that supports three way interleaving comprises three ways, or three data transmission pathways that can be used to implement three way interleaving. In some embodiments, each way corresponds to a separate memory device, such as a separate flash memory device.

In certain embodiments described below, storage medium 300 comprises multiple flash memories. In alternative embodiments, storage medium 300 may comprise other forms of nonvolatile and volatile memory. For example, storage medium 300 may comprise a nonvolatile memory such as magnetoresistive random access memory (MRAM) or phase-change random access memory (PRAM), or a volatile memory such as DRAM. Moreover, in some embodiments, storage medium 300 comprises a combination of two or more types of nonvolatile memory, two or more types of volatile memory, or a combination of volatile and nonvolatile memory.

In some embodiments, storage medium 300 comprises one or more multi-level cell (MLC) memory devices, such as a flash memory device comprising 2-bit memory cells. Furthermore, storage medium 300 may comprise memory devices having any of several different memory cell configurations, such as NAND flash memories, NOR flash memories, and One-NAND flash memories where a flash memory core and a memory controller are implemented in a single chip.

In certain embodiments, storage medium 300 comprises different types of flash memories combined in hybrid configurations, such as combinations of NAND flash and NOR flash memory. In addition, in various embodiments, the structure of the charge trapping layer of memory cells are implemented in various forms. For example, the charge trapping layer of memory cell can be configured with conductive multi-crystal silicon, or with a dielectric such as $Si_3N_4$, $Al_2O_3$, HfAlO or HfSiO. A flash memory structure using the dielectric such as $Si_3N_4$, $Al_2O_3$, HfAlO and HfSiO as a charge trapping layer is called a charge trap flash (CTF) memory.

SSD controller 100 controls read and write operations of buffer memory 200 and storage medium 300 in response to commands from host 900. SSD controller 100 also controls the overall operation of SSD 500. As described in further detail below, SSD controller 100 controls operations for reading and writing data in buffer memory 200 based on the configuration of channels and ways in storage medium 300. SSD controller 100 also schedules flash write operations so that data stored in buffer memory 200 is distributed and stored via a plurality of channels and a plurality of ways in write operations of the flash memories. A data storing scheme for buffer memory 200 and scheduling of write operations for data stored in buffer memory 200 are generally performed in accordance with a control algorithm included in SSD controller 100.

Figure 2:
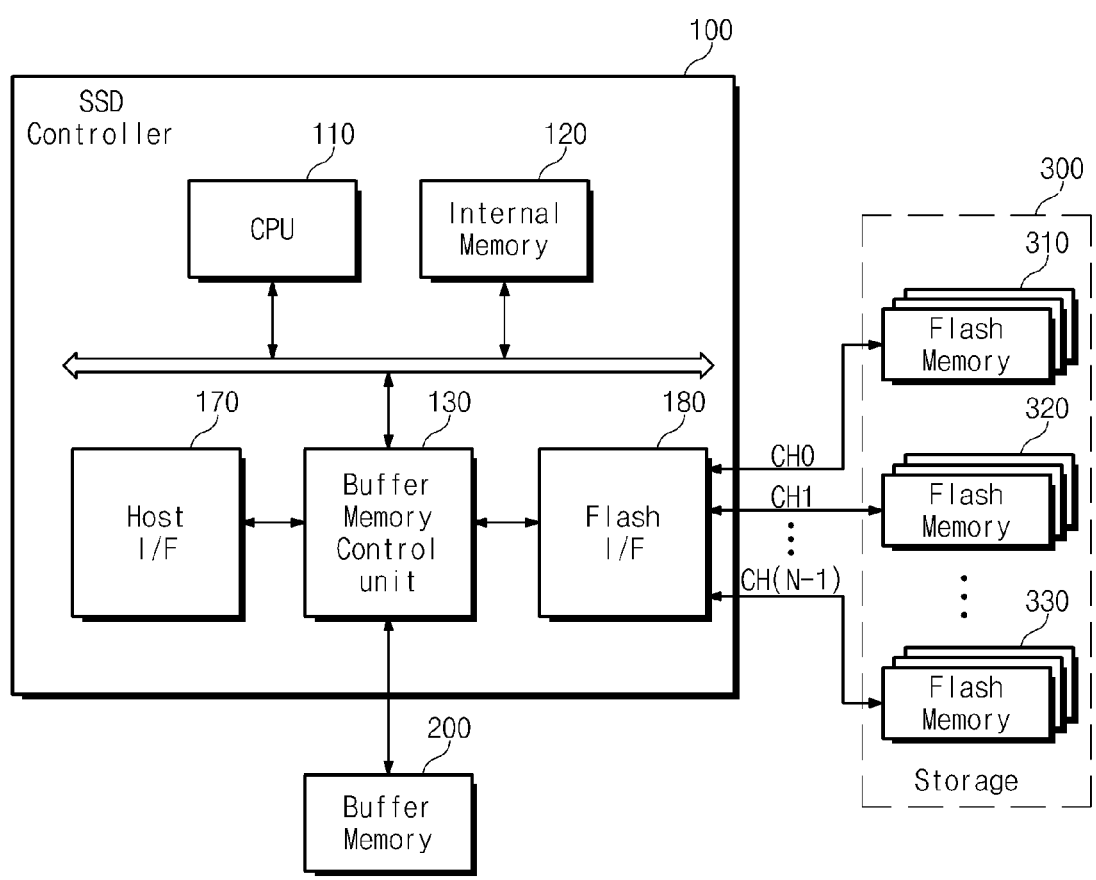
FIG. 2 is a diagram illustrating an SSD controller in the memory system of FIG. 1.

FIG. 2 is a diagram illustrating an embodiment of SSD controller 100 in FIG. 1.

Referring to FIG. 2, SSD controller 100 comprises a central processing unit (CPU) 110, an internal memory 120, a buffer memory control unit 130, a host interface 170, and a flash interface 180. CPU 110, internal memory 120, buffer memory control unit 130, host interface 170, and flash interface 180 are connected to each other via a CPU bus.

CPU 110 controls the overall operation of SSD controller 100. SSD controller 100 comprises one or more CPUs 110. Where SSD controller 100 comprises one CPU 110, it is referred to as a single core processor, and where SSD 100 comprises more than one CPU 110, it is referred to as a multi-core processor. CPU 110, internal memory 120, and buffer memory control unit 130 constitute a control logic unit. In some embodiments, the control logic unit is implemented in a single chip using system on chip (SoC) technology. In some embodiments, the single chip configuration can further incorporate host interface 170 and flash interface 180.

Figure 4:
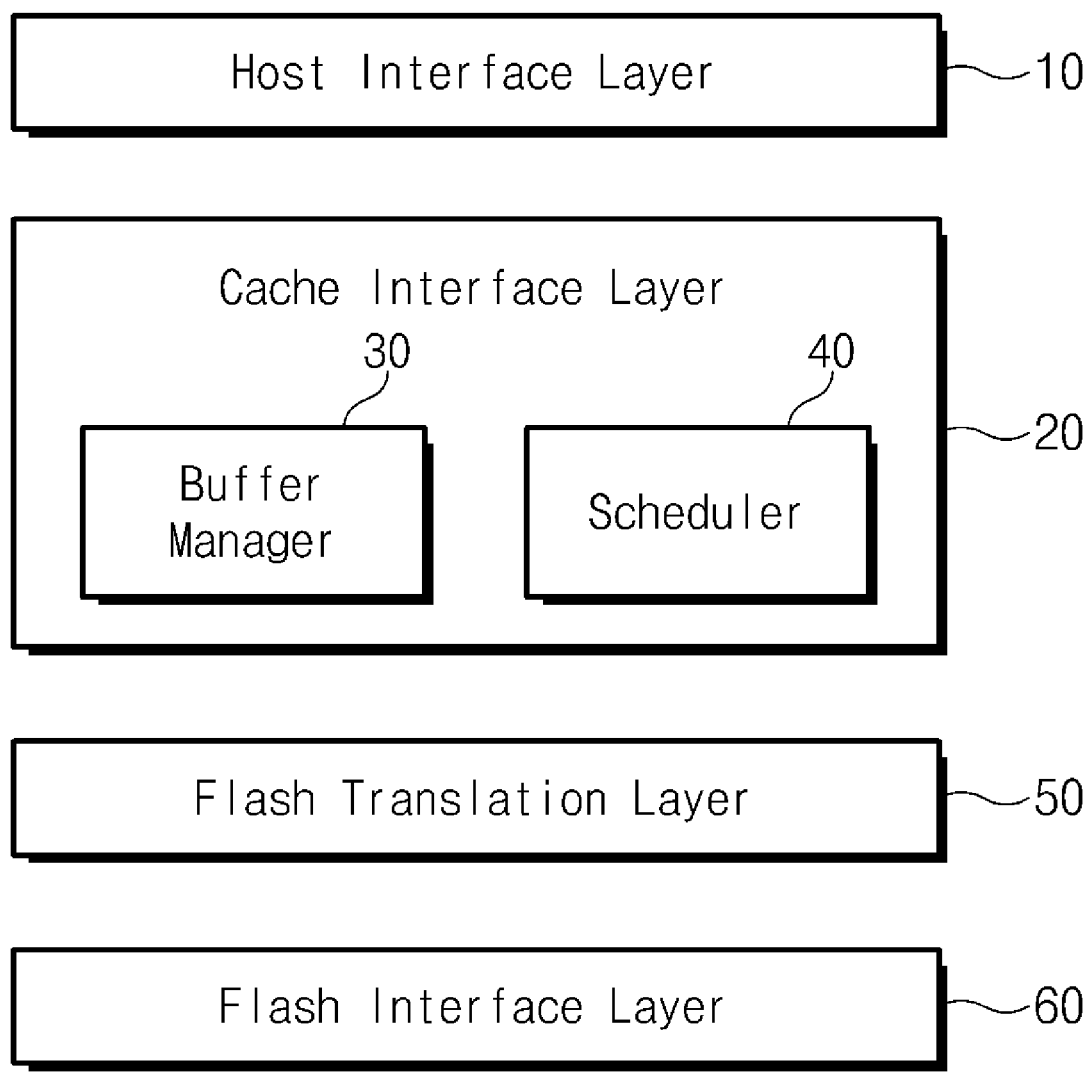
FIG. 4 is a diagram illustrating a logical layered structure of a control algorithm implemented by the SSD controller.

SSD 100 can store a control algorithm in firmware, software, or hardware. The control algorithm can be used to control the operation of CPU 110, internal memory 120, buffer memory control unit 130, host interface 170, and flash interface 180. The control algorithm is typically stored in a code region of internal memory 120, and additional information accessed by the control algorithm, such as mapping information, can be stored in a data region of internal memory 120. Internal memory 120 can be included either inside or outside CPU 110. A logical layered structure of the control algorithm executed by SSD controller 100 is illustrated in FIG. 4 and explained below.

Host interface 170 exchanges commands, addresses, and data with host 900 under the control of CPU 110. In various alternative embodiments, host interface 170 can support any of various interfaces such as universal serial bus (USB), multi media card (MMC), PCIExpress (PIC-E), AT attachment (ATA), serial AT attachment (SATA), parallel AT attachment (PATA), small computer system interface (SCSI), serial attached SCSI (SAS), Enhanced Small Disk Interface (ESDI), and integrated drive electronics (IDE).

Buffer memory control unit 130 controls access operations of internal memory 120 and buffer memory 200 under the control of CPU 110. Flash interface 180 transmits and receives data transferred between internal memory 120 and storage medium 300, and between buffer memory 200 and storage medium 300.

In a read operation of SSD 500, a read command is transmitted to SSD 500 from host 900, read data is transmitted from storage medium 300 and temporarily stored in buffer memory 200 via flash interface 180 and buffer memory control unit 130. The read data stored in buffer memory 200 is then output to an external destination, such as host 900 via buffer memory control unit 130 and host interface 170.

Write operations of SSD 500 can be performed in two stages, including a buffer memory write operation, and a flash write operation. In a buffer memory write operation, write data is input to SSD 500 via host interface 170 and temporarily stored in buffer memory 200 via buffer memory control unit 130. In the flash write operation, the write data that is temporarily stored in buffer memory 200 is transferred to storage medium 300 via buffer memory control unit 130 and flash interface 180.

Following the buffer memory write operation, CPU 110 generates a signal to indicate execution of the write operation and transmits the signal to host 900 via host interface 170. The flash write operation is performed subsequently under the control of SSD controller 100. SSD controller 100 typically does not directly issue the flash write operation, but places the flash write operation in a queue after the buffer write operation. SSD controller 100 schedules the queued flash write operations such that a plurality of flash write operations are performed in parallel using a plurality of channels and ways. Example methods for queuing and scheduling the flash write operations are described below with reference to FIGS. 9 through 11.

During buffer write operations, write data is distributed to and stored in buffer memory 200 based on the channel and way architecture of storage medium 300. This distribution and storage can be designed to improve the efficiency of processing write data stored in buffer memory 200 during flash write operations. A method of distributing and storing data in buffer memory 200 is described below with reference to FIGS. 6 through 8.

In addition to buffer memory 200, internal memory 120 can also provide temporary storage of read and write data. Accordingly, various methods described below in the context of buffer memory 200 may be adapted for use with internal memory 120. As the amount of read and write data in SSD 500 increases, the function of temporarily storing read and write data can be performed more predominantly in buffer memory 200 rather than internal memory 120.

Figure 3:
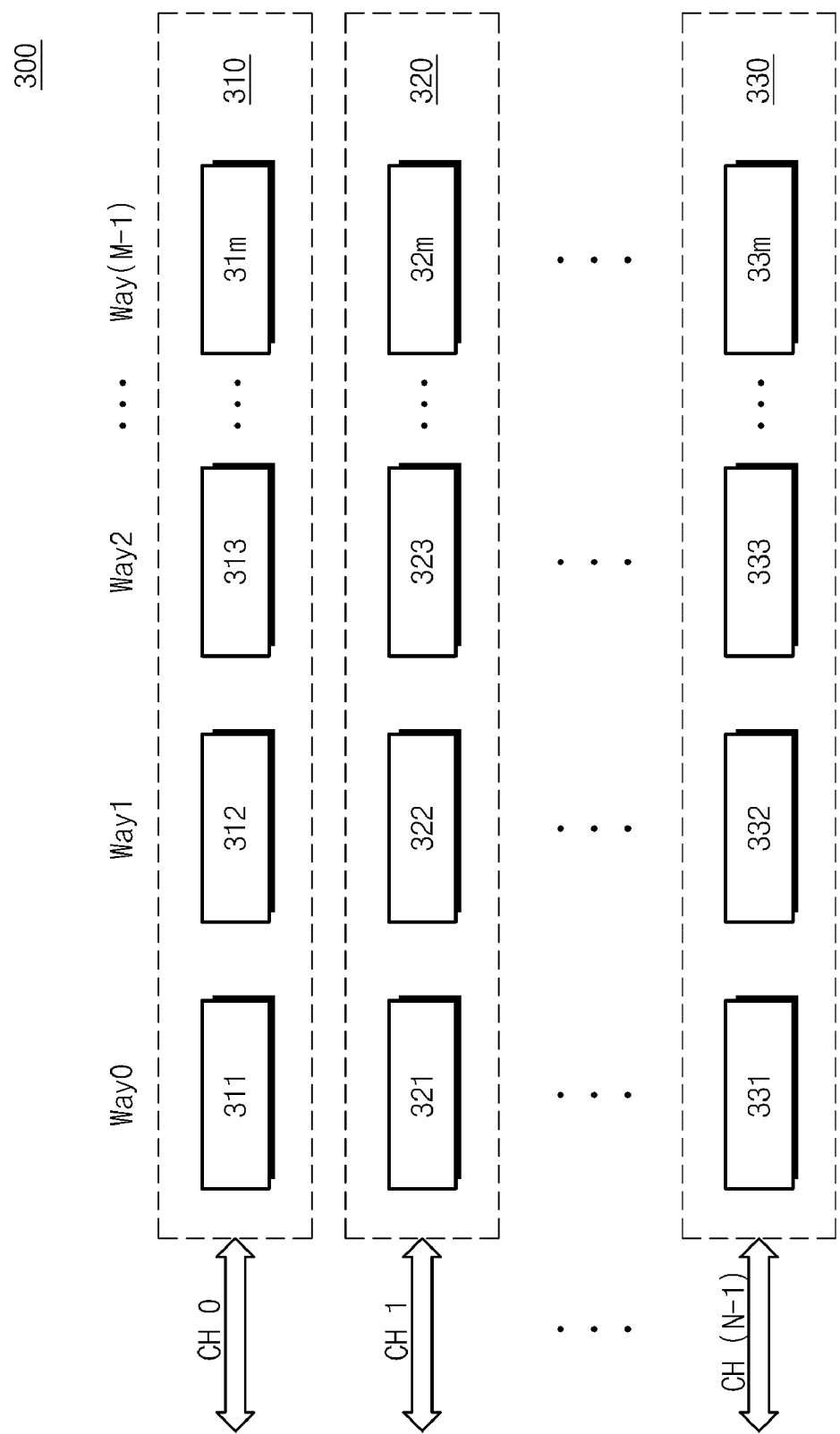
FIG. 3 is a diagram illustrating the configuration of a storage medium in FIG. 1.

FIG. 3 is a diagram illustrating channels and ways of storage medium 300.

Referring to FIG. 3, "N" channels are formed between SSD controller 100 and storage medium 300. A plurality of flash memories 310 through 330 are electrically connected to channels CH0 through CH(N-1). Each of the channels CH0 through CH(N-1) comprises an independent bus capable of transmitting/receiving commands and data to/from corresponding flash memories among flash memories 310 through 330. Flash memories 310 through 330 connected to channels CH0 through CH(N-1) typically operate independent of each other. Flash memories 310 through 330 each comprise "M" ways Way0 through Way(M-1).

In the embodiment of FIG. 3, "M" flash memory chips are connected to the "M" ways of each channel. For instance, channel CH0 is connected to "M" flash memory devices 311 through 31n, which correspond to ways Way0 through Way (M-1) of flash memory 310. Channels CH1 through CH(N-1) are similarly connected to "M" flash memory devices of flash memories 320 through 330.

In view of the correspondences between flash memory devices, channels, and ways in FIG. 3, each flash memory device can be identified based on a distinct channel and way. For instance, flash memory device 311 corresponds uniquely to channel CH0 and way Way0, flash memory device 312 corresponds uniquely to channel CH1 and way Way1, and so on. In memory access operations, a particular channel and way in storage medium 300 can be determined from a logical block address (LBA).

Unlike storage medium 300, buffer memory 200 typically lacks a channel and way configuration. Moreover, buffer write operations can generally be performed in buffer memory 200 irrespective of the channel and way configuration of the flash memories in storage medium 300.

Data storing method and scheduling methods of buffer memory 200 allow flash write operations to be issued for channels where a flash write operation is already being performed. However, where a current flash write operation is being performed in a channel, a next-issued flash write operation for the channel waits until the current flash write operation completes. This may cause undesirable delay in a flash memory.

To prevent such delays, memory system 1000 distributes data to buffer memory 200 and stores the data in buffer memory 200 based on the channel and way structure of storage medium 300 when performing write operations. Memory system 1000 also schedules flash write operations so that data stored in buffer memory 200 is distributed to multiple channels and ways. These features of memory system 1000 reduce latency that may be caused by differences in the respective physical configurations of storage medium 300 and buffer memory 200, and may improve the performance of SSD 500.

Figure 5:
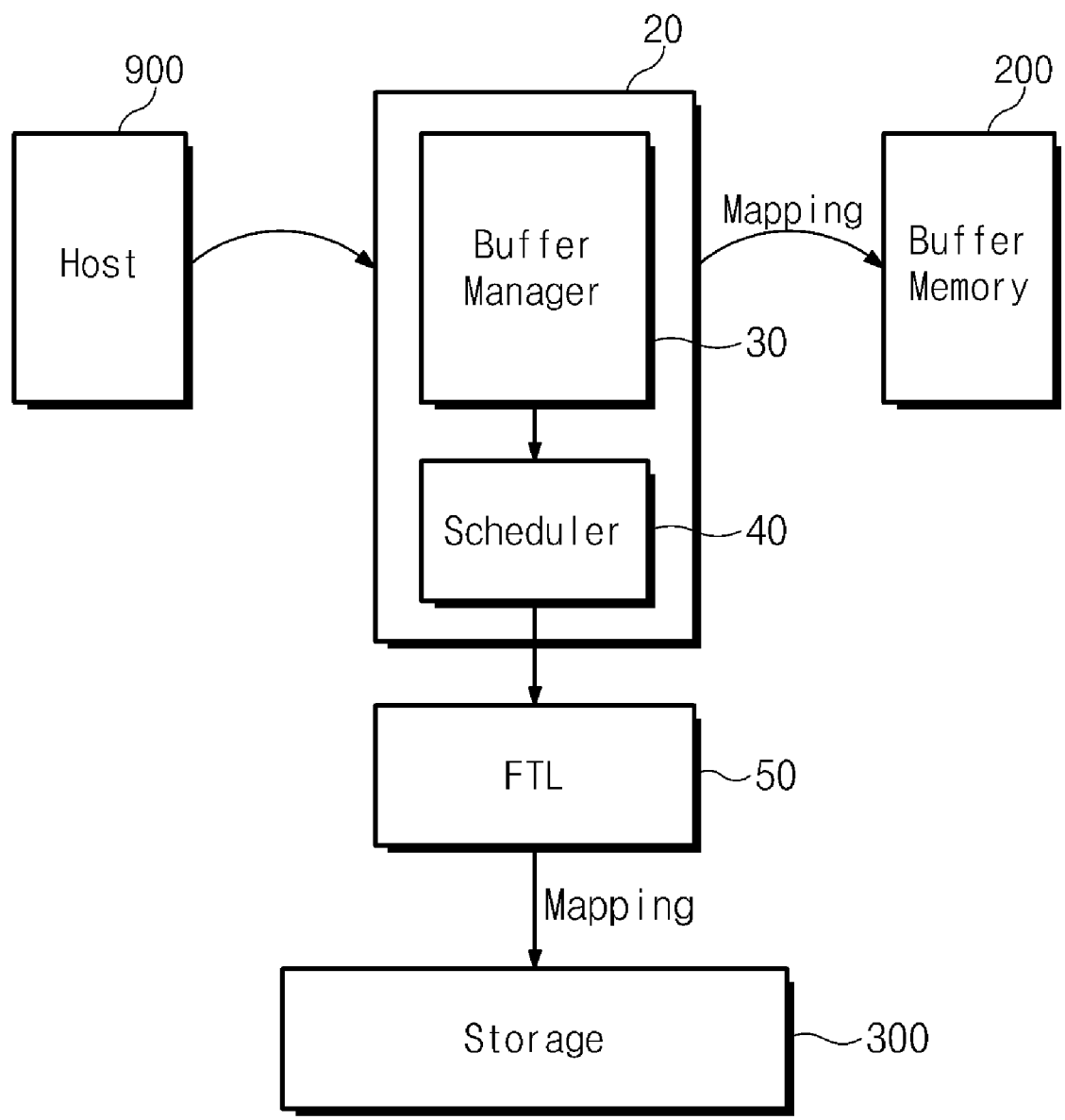
FIG. 5 is a diagram for describing the operation of the control algorithm of FIG. 4.

FIG. 4 is a diagram illustrating a logical layered structure of a control algorithm executed by SSD controller 100 in accordance with an embodiment of the inventive concept, and FIG. 5 is a diagram for describing the operation of the control algorithm in FIG. 4.

Referring to FIGS. 4 and 5, the control algorithm executed by SSD controller 100 comprises a host interface layer 10, a cache interface layer 20, a flash translation layer (FTL) 50, and a flash interface layer 60.

FTL 50 typically performs a variety of functions related to memory access, such as address translation and memory allocation. For instance, FTL 50 can change an LBA provided from host 900 into a logical page number (LPN), or map the LPN into a physical block address (PBA) of an erased flash memory. FTL 50 can also perform functions such as bad block management, data retention management in case of unexpected power loss, and wear monitoring and management. Address mapping information of flash memories 310 through 330 can be stored in arbitrary regions (e.g., meta regions) of flash memories 310 through 330, and the stored address mapping information can be loaded to internal memory 120 or buffer memory 200 during power-up of memory system 1000.

Host interface layer 10 provides functions for interface operations between host 900 and host interface 170. These functions can be implemented, for instance, by software or firmware stored in host interface 170 or internal memory 120.

Flash interface layer 60 provides functions for interface operations between flash interface 180 and flash memories in storage medium 300. These functions can be implemented, for instance, by software or firmware stored in internal memory 120.

Cache interface layer 20 provides functions for controlling read and write operations of internal memory 120 and/or buffer memory 200 performed in buffer memory control unit 130. These functions can be implemented, for instance, by software or firmware stored in internal memory 120. Cache interface layer 20 comprises a buffer manager 30 and a scheduler 40.

Buffer manager 30 provides functions for managing data stored in buffer memory 200 based on the channel and way structures of flash memories 310 through 330. For example, in some embodiments, buffer manager 30 classifies sectors of buffer memory 200 in volume and bank units. Data is then distributed the sectors of buffer memory 200 based on the classifications. In one example, the volume of buffer memory 200 corresponds to a channel of storage medium 300, and the bank of buffer memory 200 corresponds to a way within the channel. The physical configuration of the volume and bank of buffer memory 200 are below with reference to FIG. 6.

Buffer manager 30 uses the logical page numbers (LPNs) of flash memories 310 through 330 to distribute data to be stored in buffer memory 200 in volume and bank units. Each LPN comprises a logical data unit managed in FTL 50. Mapping information between the LPN of each of flash memories 310 through 330 and the volume and bank of buffer memory 200 may be stored in internal memory 120 or buffer memory 200. The mapping information of buffer memory 200 may be stored as a mapping table. After data is distributed to and stored in buffer memory 200 (i.e., after a buffer write operation is performed), buffer manager 30 registers a flash write operation in scheduler 40 without issuing the flash write operation to FTL 50. In certain embodiments, each flash write operation registered in scheduler 40 is defined as a job unit. Write data corresponding to one job unit is provided from a sector designated by one cache line of buffer memory 200.

Scheduler 40 schedules flash write operations so that data distributed to and stored in buffer memory 200 is distributed to the channels and ways of storage medium 300. Scheduler 40 configures a job unit plate in consideration the volume and bank information of buffer memory 200 corresponding to each job unit. A plurality of job units are included in a job unit plate, and a plurality of job unit plates form a job unit box. Scheduler 40 issues a plurality of flash write operations corresponding to the job unit plate to FTL 50 each time the flash write operations provided from buffer manager 30 form a job unit plate. Data to be written in the issued flash write operations is provided from a plurality of sectors designated by one cache way of buffer memory 200.

FTL 50 maps an LPN corresponding to each flash write operation to the PBA of a corresponding flash memory in response to the flash write operations issued from scheduler 40. FTL 50 writes data in a flash memory corresponding to the mapped PBA. The configuration of the job unit, job unit plate and job unit box and a command scheduling method performed in scheduler 40 are described below with reference to FIGS. 9 through 11.

Figure 6:
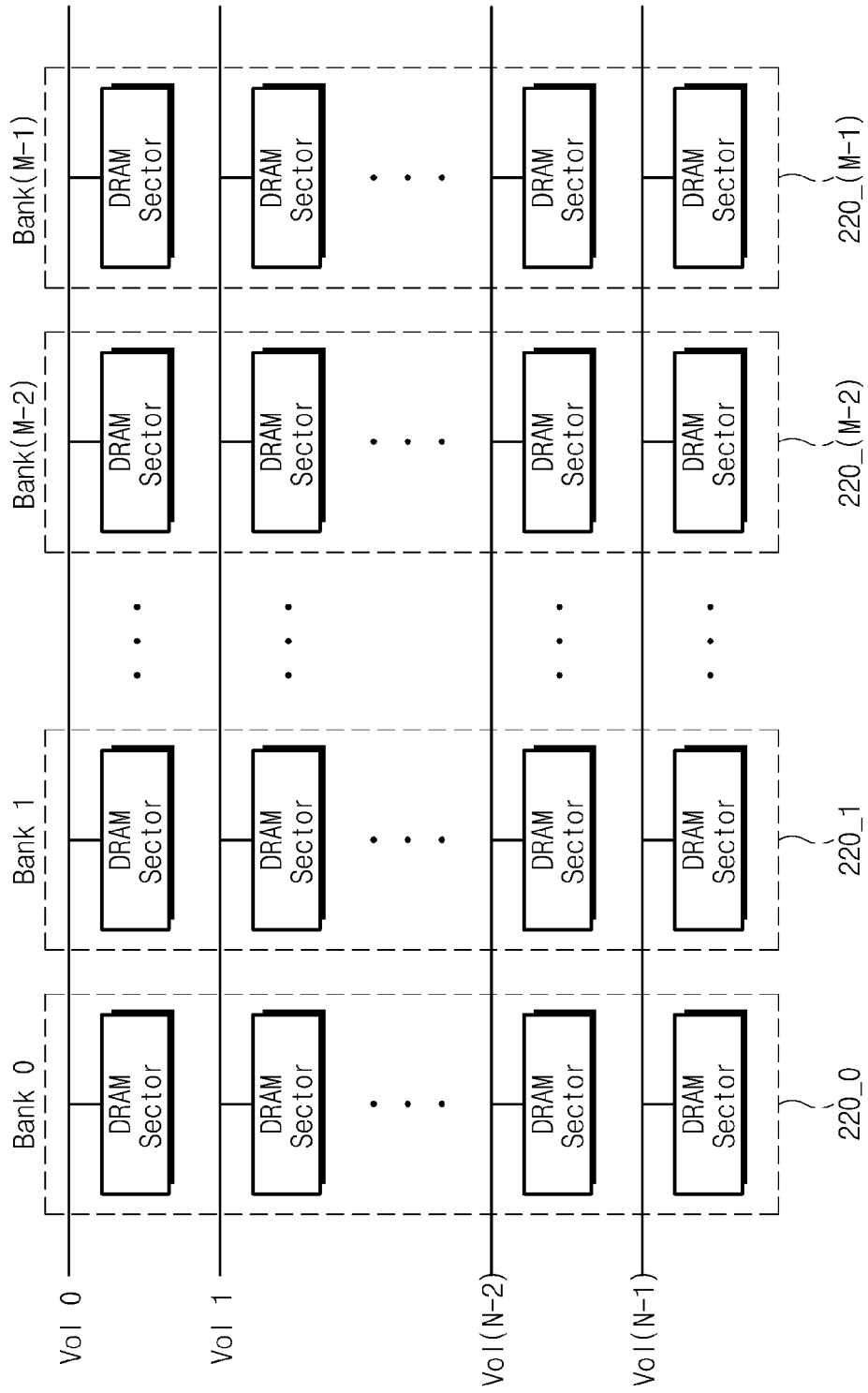
FIG. 6 is a diagram illustrating a cache line, cache line group, and cache way of a buffer memory.

FIG. 6 is a diagram illustrating the physical configuration of a cache line, cache line group, and cache way of buffer memory 200 according to an embodiment of the inventive concept. In particular, FIG. 6 illustrates the configuration of a single cache way 210.

Referring to FIG. 6, buffer memory 200 comprises a plurality of sectors corresponding to "N" volumes and "M" banks The "N" volumes correspond to the "N" channels of storage medium 300, and the "M" banks correspond to the "M" ways of storage medium 300.

The logical address of a set of an N×M number of sectors configured with "N" volumes and "M" banks is defined as cache way 210. The logical address of one sector corresponding to one volume and one bank is defined as a cache line. A plurality of cache ways may correspond to buffer memory 200. In each cache way, "N" cache lines arranged in the column direction constitute a cache line group 220_i. "M" cache line groups 220_0 through 220_(M-1) are included in cache way 210. The "N" cache lines included in cache line group 220_i correspond to "N" channels, respectively.

Figure 7:
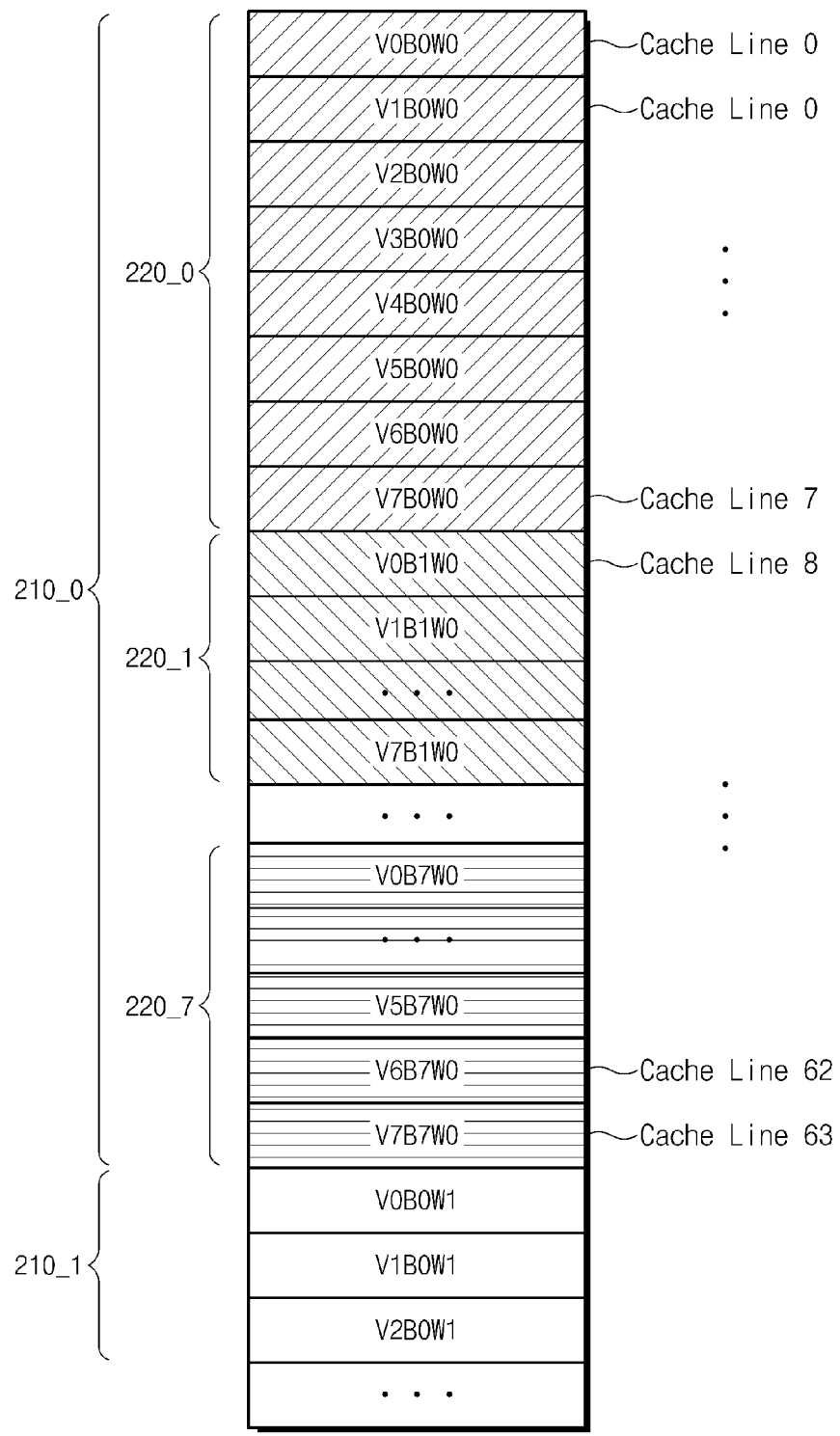
FIGS. 7 and 8 are diagrams illustrating a cache line, cache line group, and cache way corresponding to a logical address of the buffer memory.
Figure 8:
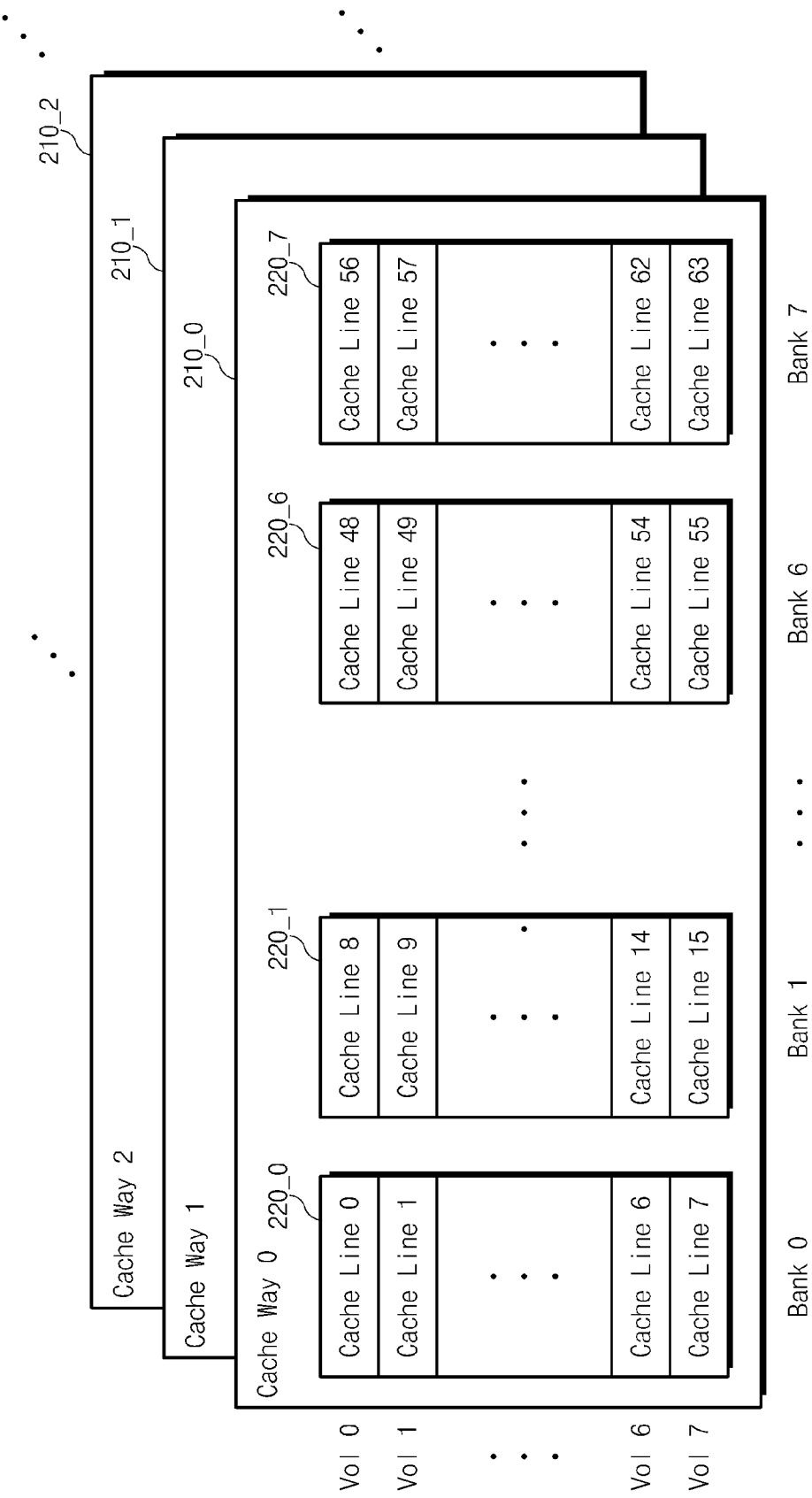

FIGS. 7 and 8 are diagrams illustrating the physical configuration of the cache line, cache line group, and cache way corresponding to a logical address of buffer memory 200 according to an embodiment of the inventive concept. In the example of FIGS. 7 and 8, a cache way comprises eight volumes and eight banks In FIG. 7, the configuration of one cache way is illustrated. In FIG. 8, the configuration of a plurality of cache ways is illustrated.

Referring to FIGS. 7 and 8, buffer memory 200 comprises a plurality of cache ways 210_i, and each cache way 210_i comprises a plurality of sequentially arranged cache line groups 220_0 through 220_7. Each cache line group 220_i comprises a plurality of sequentially arranged cache lines "Cache Line X . . . ".

The base unit of the logical address of buffer memory 200 in FIGS. 7 and 8 is a cache line "Cache Line X". Each of the cache lines corresponds to one sector (e.g., 512 bytes) of buffer memory 200, and eight sectors correspond to one page of a flash memory. Logical addresses in FIGS. 7 and 8 may respectively correspond to the physical locations of sectors in FIG. 6 by making the cache line "Cache Line X" a base unit.

For example, where a write command and a corresponding logical block address are received from host 900, an LBA is converted into an LPN by FTL 50. Based on the LPN, buffer manager 30 determines the physical address (i.e., volume and bank) of buffer memory 200. The LPN is used as the logical address of buffer memory 200, and it is used to determine the logical address of cache line "Cache Line X". The physical address of buffer memory 200 can be determined by a mapping operation performed by buffer memory control unit 130. Buffer memory 130 stores the result of the mapping operation in internal memory 120 or buffer memory 200 under the control of buffer manager 30. The mapping operation is typically performed using a mapping table.

After the physical address of buffer memory 200 is determined, buffer memory control unit 130 stores write data in the sector of a corresponding physical address under the control of buffer manager 30. The operation of storing the write data in buffer memory 200 is called a buffer write operation. After the buffer write operation is performed, buffer manager 30 registers a corresponding flash write operation in scheduler 40 in consideration of information regarding a volume and a bank where the buffer write operation has been performed.

Figure 9:
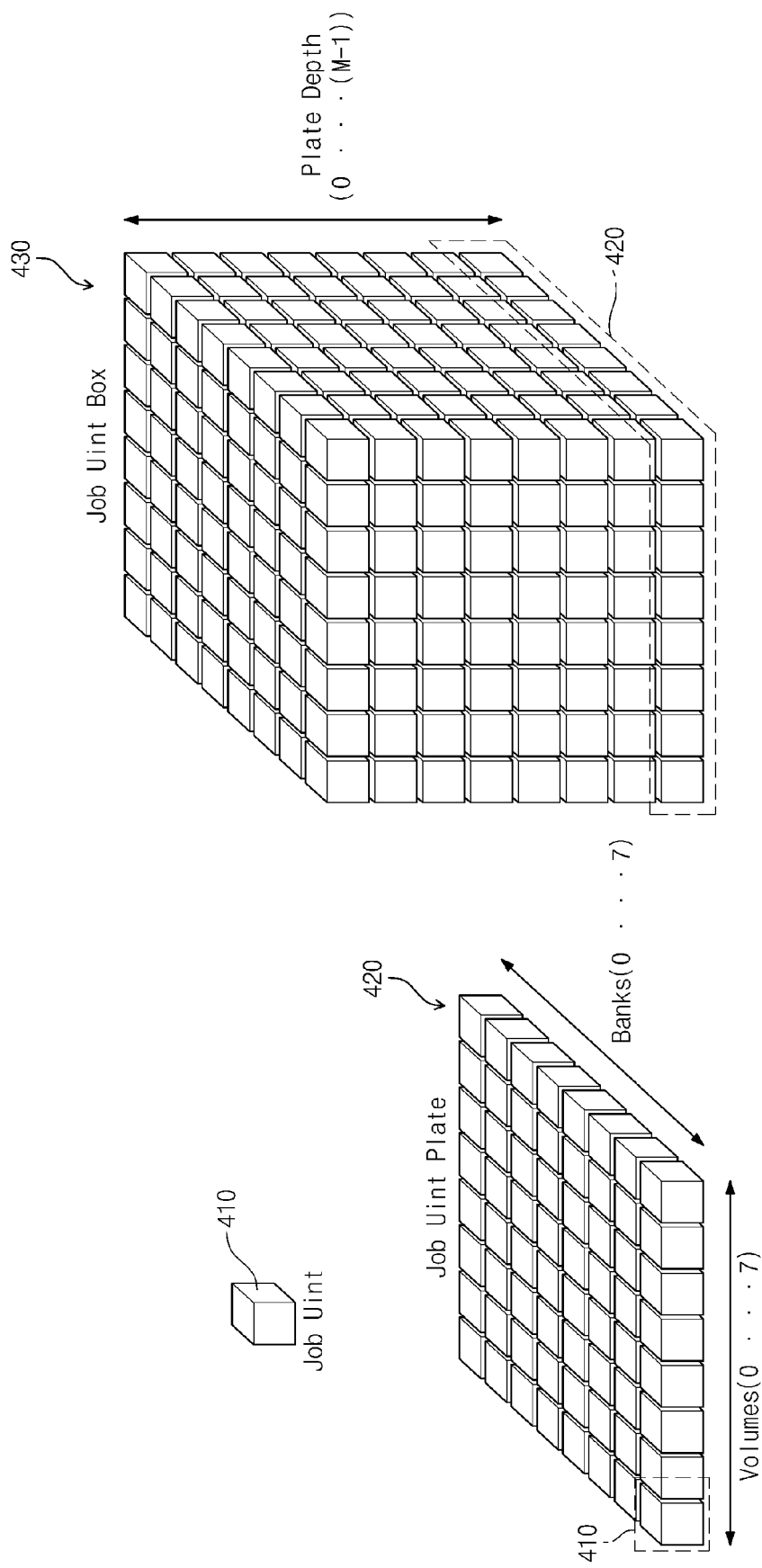
FIG. 9 is a diagram illustrating a job unit, a job unit plate, and a job unit box that are used for scheduling operations of a memory system according to an embodiment of the inventive concept.

FIG. 9 is a diagram illustrating the configuration of a job unit, a job unit plate and a job unit box used for a scheduling operation according to an embodiment of the inventive concept.

Referring to FIGS. 4 and 9, after write data is stored in buffer memory 200, scheduler 40 queues a flash write operation, which is registered by buffer manager 30, in a job unit. Scheduler 40 performs scheduling so that the queued flash write operations are distributed to the channels and ways of storage medium 300. The queued flash write operations are issued to FTL 50 in certain units (for example, job unit plate units) according to the scheduling result of scheduler 40. As a result, write data distributed to and stored in buffer memory 200 is distributed to and stored in the channels and ways of storage medium 300.

In some embodiments, the base unit of a flash write operation queued by scheduler 40 is a job unit 410, and a plurality of job units form a job unit plate 420. For example, where "N" channels and "M" ways are included in storage medium 300, the sectors of buffer memory 200 are divided into "N" volumes and "M" banks, and N×M job units form a job unit plate.

The example of FIG. 9 shows the configuration of a job unit plate and job unit box where storage medium 300 comprises eight channels and eight ways. In other embodiments, different numbers of job units can form each job unit plate 420 based on the number of channels and ways in storage medium 300.

A plurality of job unit plates form a job unit box 430. A job unit plate in the lowermost portion of job unit box 430, is defined as a base plate. The base plate has substantially the same volume and bank configurations as the other job unit plates in job unit box 430. Job unit box 430 has depth (e.g., depth=M). The depth of job unit box 430 corresponds to the number of job unit plates 420 in job unit box 430. The depth of job unit box 430 can be varied according to the capacity of data that can be queued by scheduler 40.

Figure 10:
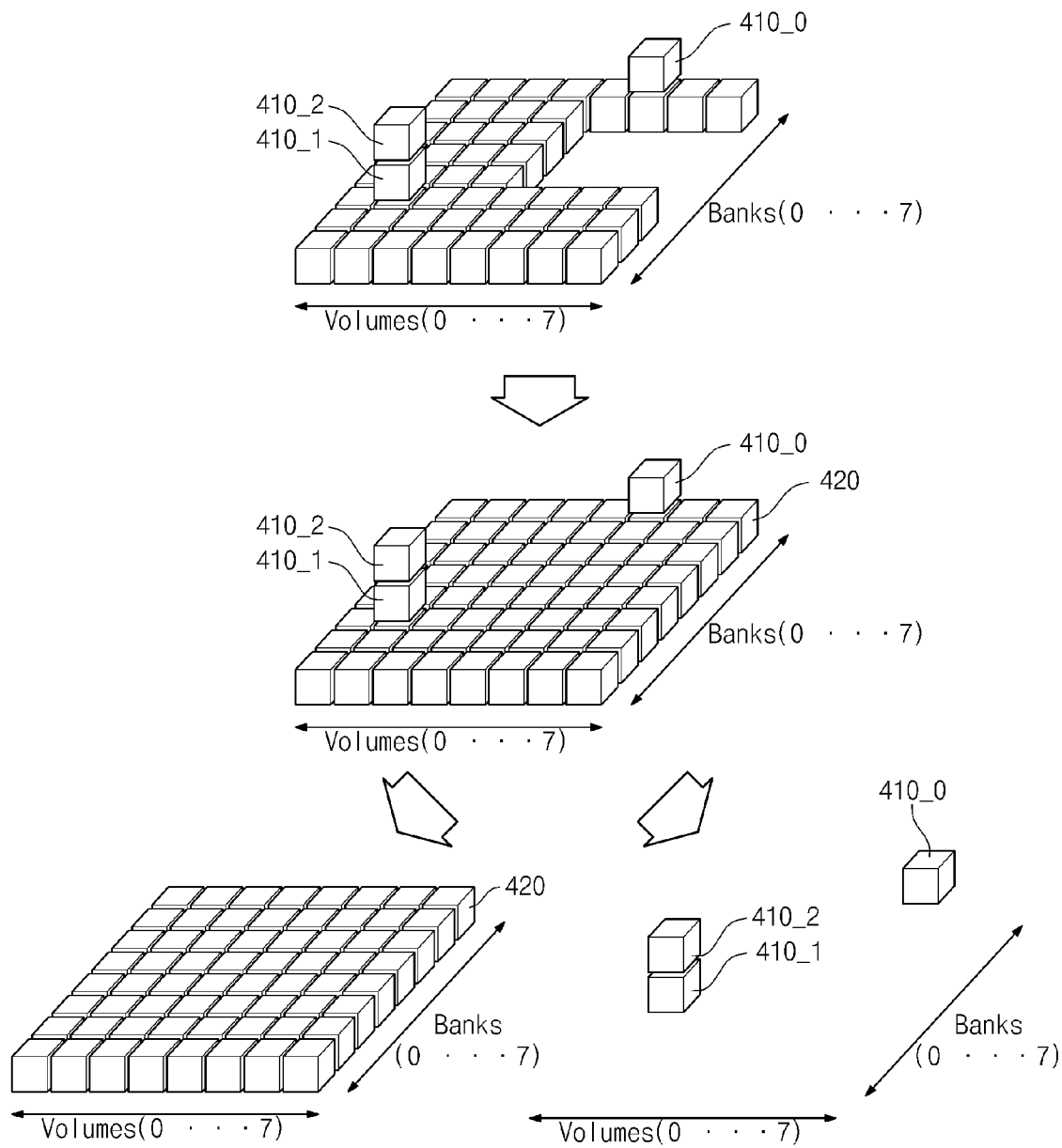
FIG. 10 is a diagram illustrating a method of scheduling commands according to an embodiment of the inventive concept.

FIG. 10 is a diagram for describing a command scheduling method according to an embodiment of the inventive concept.

Referring to FIG. 10, in a write operation of SSD 500, a buffer write operation is performed, and then buffer manager 30 registers a corresponding flash write operation in scheduler 40. Scheduler 40 queues the flash write operation registered by buffer manager 30 in a job unit type without issuing it to FTL 50. For instance, in FIG. 10, reference numbers 410_0, 410_1 and 410_2 denote job units corresponding to queued flash write operations.

Each job unit has a location on a job unit plate according to volume and bank information (or channel and way information) corresponding to each flash write operation. For example, in the embodiment of FIG. 10, job unit 410_0 corresponds to a volume 5 and a bank 7, and job units 410_1 and 410_2 correspond to a volume 1 and a bank 2. Write operations 410_1 and 410_2 corresponding to the same volume and bank are vertically stacked on the job unit plate. The number of job units that can be stacked at the same location is determined according to the depth of the job unit box.

Scheduler 40 issues a plurality of flash write operations corresponding to a job unit plate 420 to FTL 50 each time the queued job units form one job unit plate 420. A configured job unit plate 420 corresponds to a base plate that is disposed at the lowermost portion of the job unit box. Unissued job units remain queued by scheduler 40. Scheduler 40 queues a new job unit each time a new flash write operation is registered. Where the queued job units constitute a new job unit plate (e.g., a base plate), scheduler 40 issues flash write operations corresponding to the newly-configured job unit plate to FTL 50.

The flash write operations issued to FTL 50 are flash write operations to be performed in the "N" channels and "M" ways of storage medium 300. FTL 50 performs address mapping to convert the LPNs of a plurality of issued operations into PBAs of a flash memory. Write data provided from the "N" volumes and "M" banks of buffer memory 200 are stored in the PBAs of the flash memories of the "N" channels and "M" ways, respectively. Flash write operations are then performed in parallel in the flash memories corresponding to the "N" channels and "M" ways. As a result, the channel utility and data storage performance of SSD 500 can be enhanced.

Figure 11:
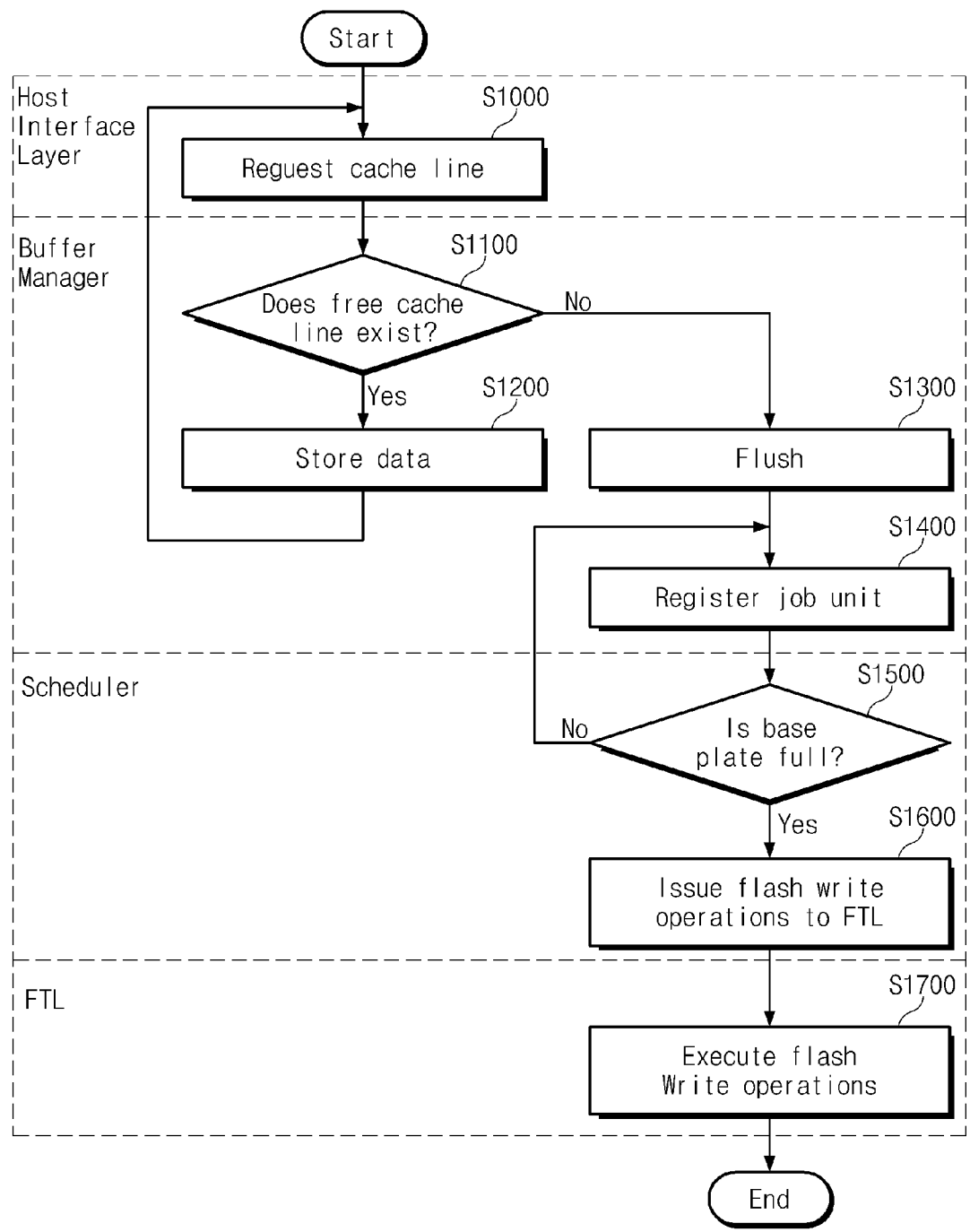
FIG. 11 is a flowchart illustrating a method of storing data in an SSD according to an embodiment of the inventive concept.

FIG. 11 is a flowchart illustrating a data storing method of SSD 500 according to an embodiment of the inventive concept.

Referring to FIG. 11, where a write command is received from host 900, host interface 170 requests a cache line to buffer memory control unit 130 under the control of host interface layer 10 (S1000). The cache line represents a sector where write data to be written according to a request by a write command is temporarily stored.

Then, under the control of buffer manager 30, buffer memory control unit 130 determines whether a free cache line exists in buffer memory 200 (S1100). Where a free cache line exists (S1100=Yes), a cache line to store the write data is allocated to buffer memory control unit 130 under the control of buffer manager 30, and buffer memory control unit 130 temporarily stores the write data in the allocated cache line (S1200). Where the a free cache line does not exist (S1100=No), buffer memory control unit 130 selects a victim cache line and performs a flush operation under the control of buffer manager 30 (S1300). A flush operation causes compulsory output of data stored in buffer memory 200. Buffer memory control unit 130 obtains the volume and bank information of a flushed cache line under the control of buffer manager 30. Following the flush operation, buffer memory control unit 130 registers a flash write operation for storing data of the flushed cache line in a flash memory, in scheduler 40 in a job unit (S1400).

Next, scheduler 40 queues a registered job unit and determines whether a base plate is filled with the queued job units (S1500). Where the base plate is not filled with the queued job units (S1500=No), the method returns to operation S1400. Otherwise, where base plate is filled with queued job units (S1500=Yes), scheduler 40 issues a plurality of flash write operations corresponding to the base plate to FTL 50 (S1600).

Finally, FTL 50 performs issued flash write operations (S1700). In operation S1700, FTL 50 identifies the PBAs of a plurality of flash memories for storing the write data, in response to the issued flash write operations, and the write data is stored in the PBAs. Specific flash write operations are performed in parallel or at the same time in a plurality of flash memories corresponding to a plurality of channels and a plurality of ways.

Although the method of FIG. 11 relates to the queuing of write operations in memory system 1000. The method, however, can be modified to provide queuing for other operations, such as read operations of SSD 500. In addition, the described method can also be combined with other queuing techniques, such as native command queuing (NCQ) and tagged command queuing (TCQ).

Figure 12:
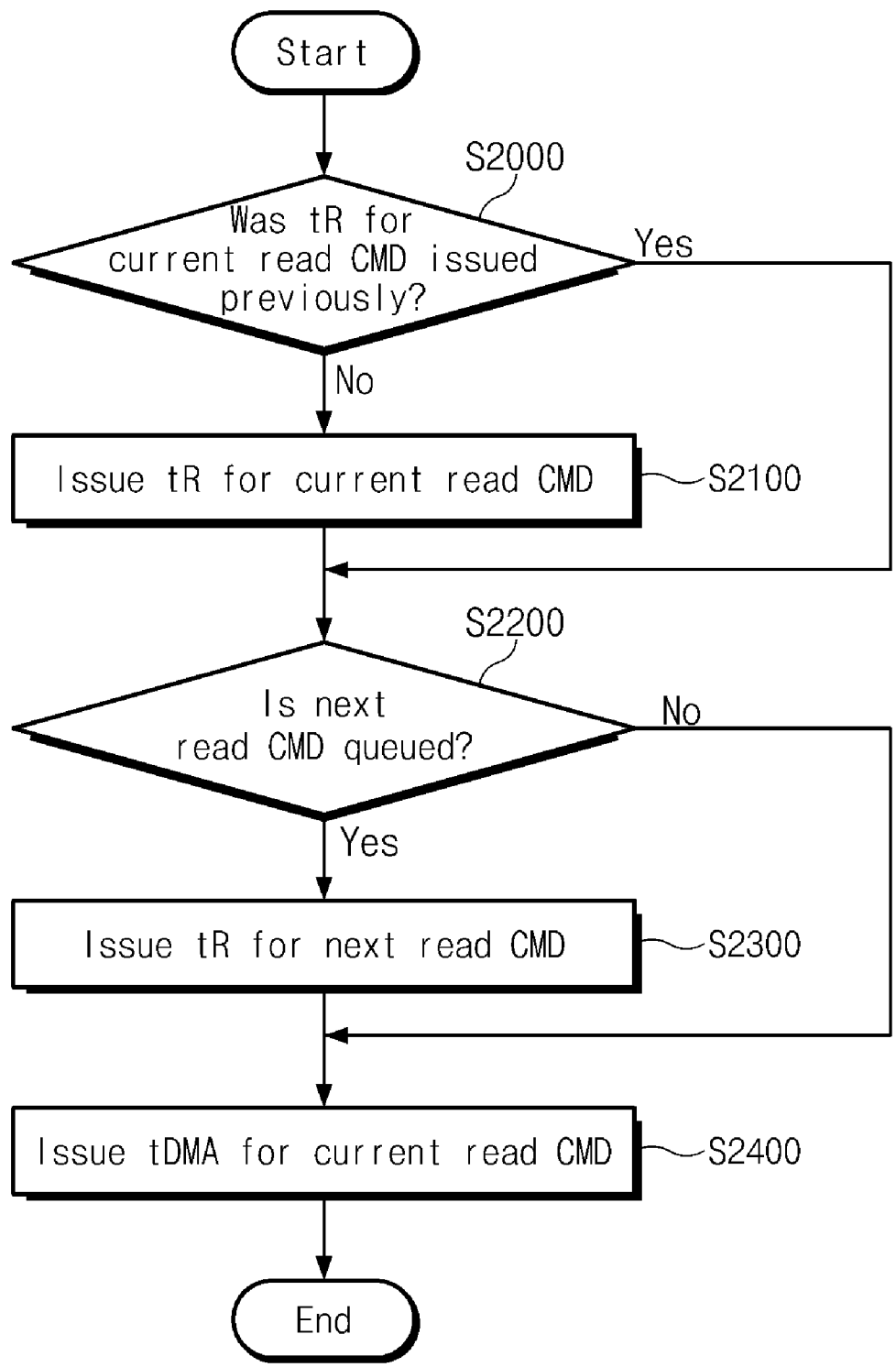
FIG. 12 is a flowchart illustrating a method of executing a read operation according to an embodiment of the inventive concept.

FIG. 12 is a flowchart illustrating a method of performing a read operation according to an embodiment of the inventive concept.

Referring to FIG. 12, the method first determines whether a command or a control signal for initiating a data sensing period tR for a current read operation has been previously issued (S2000).

Where the command or the control signal has not been previously issued (S2000=No), SSD controller 100 issues a command or a control signal to a flash memory to initiate the data sensing period tR (S2100). Whether the command or the control signal has been previously issued indicates whether the current read command is a first read command in a plurality of consecutive read commands. In response to the command or control signal issued in operation S2100, data is sensed from the flash memory of a channel and a way designated by the current read command. The sensing operation of the flash memory is performed by a page buffer included in the flash memory. Data sensed from the flash memory is stored in a data storage area such as an IO buffer of the flash memory. Subsequently, the method determines whether a next read command is queued in SSD controller 100 (S2200). A queuing function for commands to be executed subsequently may be implemented by a command queuing scheme such as NCQ and TCQ.

When the determination of operation S2000 indicates that the command or the control signal for initiating the data sensing period tR for the current read command has been previously issued (S2000=Yes), the method proceeds from operation S2000 to operation S2200. Where the command or control signal for initiating the data sensing period tR for the current read command has been previously issued, the current read command is not the first read command of a plurality of consecutive read commands.

Where the result of operation S2200 indicates that the next read command to be is queued in SSD controller 100 (S2200=Yes), SSD controller 100 issues a command or a control signal to initiate a data sensing period tR for the next read command (S2300). In response to the command or control signal issued in operation S2300, data is sensed from the flash memory of a channel and a way designated by the next read command. The sensed data is stored in a data storage element, such as a page buffer, within the flash memory. After the command or the control signal is issued in operation S2300, SSD controller 100 issues a command or a control signal for initiating a data transmission period 'tDMA' for a current read command (S2400).

Where the result of operation S2200 shows that the read command to be executed after is not queued (S2200=No), SSD controller 100 proceeds to operation S2400 and initiates a data transmission period 'tDMA' corresponding to a current read command. In the data transmission period 'tDMA', data sensed from a flash memory by the current read command is provided to SSD controller 100 through a DMA transmission scheme. The data provided to SSD controller 100 is stored in buffer memory 200.

FIG. 12 illustrates only a data sensing operation and a data transmission operation performed between the flash memory and SSD controller 100, and does not illustrate transmission operation between SSD controller 100 and host 900. Although not shown, data transmitted to SSD controller 100 by a read command is typically provided to host 900.

The method of FIG. 12 can be performed independently for each channel in storage medium 300. In certain embodiments, a plurality of queued read commands may be executed in parallel using the method of FIG. 12 for each channel. By performing such parallel operations, the overall time required to perform the read commands can be reduced, and data transmission efficiency for each channel improved. As the number of read commands allocated to each channel increases, the read efficiency can be improved.

Figure 13:
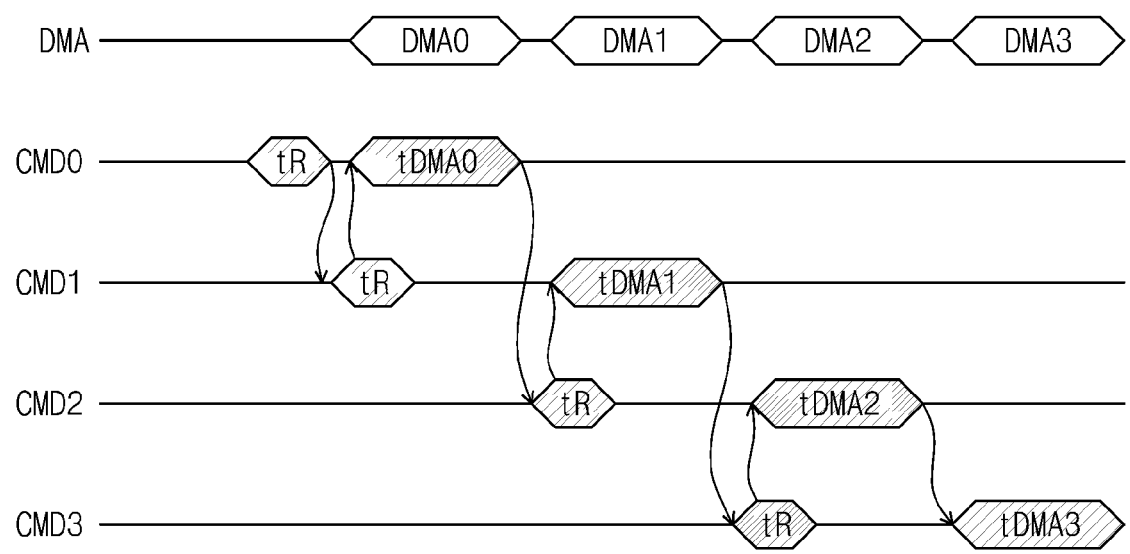
FIG. 13 is a timing diagram illustrating a method of executing a read operation according to an embodiment of the inventive concept.

FIG. 13 is a timing diagram for describing a method of executing a read command according to an embodiment of the inventive concept. In the example of FIG. 13, four read commands CMD0 through CMD3 are executed in four ways included in the same channel. The read commands are typically queued by an NCQ scheme or a related command queuing scheme.

Referring to FIG. 13, after a data sensing period tR for a first command CMD0 is completed, a data sensing period tR for a second command CMD1 begins. Upon initiation of the data sensing period tR for second command CMD1, a data transmission period tDMA0 for first command CMD0 is started. Upon completion of data transmission period tDMA0, a data sensing period tR for a third command CMD2 is started. Upon initiation of the data sensing period tR for third command CMD2, a data transmission period tDMA1 is initiated for second command CMD1. Upon completion of data transmission period tDMA1, a data sensing period tR for a fourth command CMD3 is initiated. Upon initiation of data sensing period tR for the fourth command CMD3, a data transmission period tDMA2 for the third command CMD2 is started. Upon completion of data transmission period tDMA2, a data transmission period tDMA3 is initiated for fourth command CMD3.

As indicated by the example of FIG. 13, where four read commands CMD0 through CMD3 are performed in four ways included in the same channel, a portion or the entirety of at least one data sensing period tR and a portion or the entirety of at least one of data transmission periods tDMA1 through tDMA3 are overlapped. The time of overlap between data sensing period tR and data transmission periods tDMA1 through tDMA3 can be similar to the start times (or setup times) of the data transmission period tDMA1 through tDMA3. The start and end times of the data sensing period tR and data transmission period tDMA1 through tDMA3 for the read commands CMD0 through CMD3 can be variously adjusted by various kinds of control devices having the similar control functions as SSD controller 100.

As described above, the data storage device 500 executes a plurality of queued read commands in channel units in parallel. By applying the methods of FIGS. 12 and 13 for each channel, the overall time required to perform read commands on the same channel can be reduced. As a result, read efficiency of the data storage device 500 can be enhanced.

Figure 14:
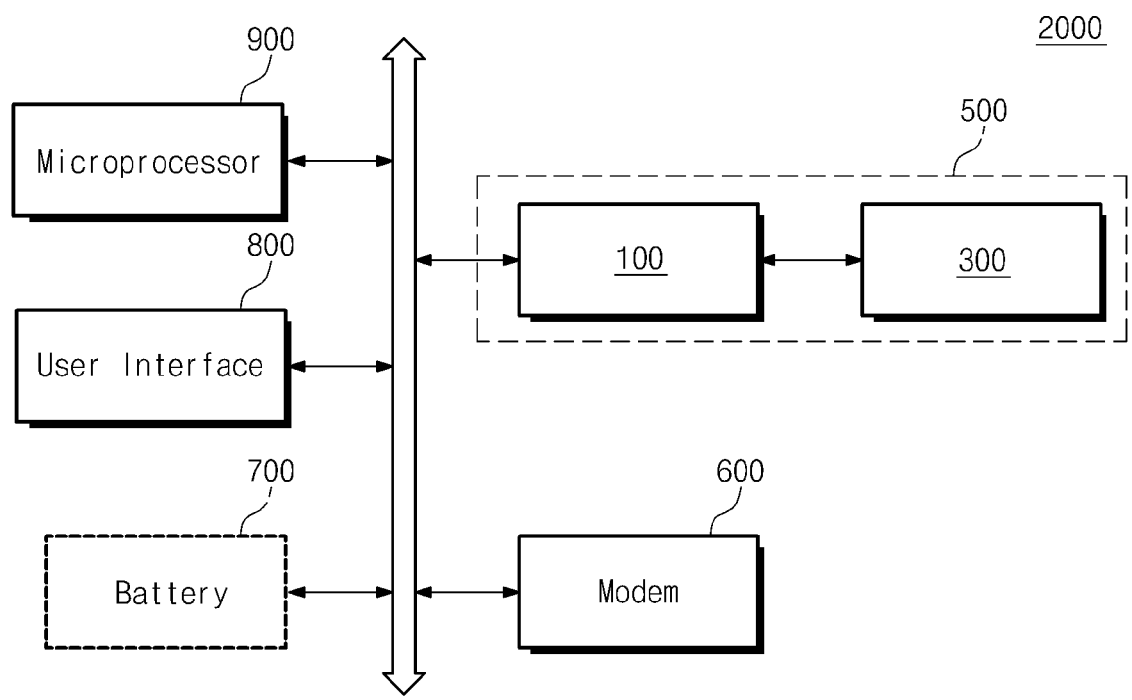
FIG. 14 is a diagram illustrating the configuration of a computing system according to an embodiment of the inventive concept.

FIG. 14 is a diagram illustrating the configuration of a computing system 2000 according to an embodiment of the inventive concept.

Referring to FIG. 14, computing system 2000 comprises SSD controller 100, storage medium 300, a modem 600, a user interface 800, and a microprocessor 900. Modem 600 comprises a baseband chipset or a baseband SoC.

SSD controller 100 and storage medium 300 of FIG. 14 are incorporated in SSD 500 as illustrated in FIGS. 1 and 2. The configuration of SSD 500 of FIG. 14 is the substantially same as that described above with reference to FIGS. 1 and 2.

Storage medium 300 is the main storage of SSD 500. Data that has been processed or is to be processed by microprocessor 900 is stored in storage medium 300 via SSD controller 100. Storage medium 300 comprises a nonvolatile memory that supports a plurality of channels and a plurality of ways as illustrated, for instance, in the embodiments of FIGS. 2 and 3.

SSD 500 comprises a buffer memory that temporarily stores data transmitted between SSD controller 100 and storage medium 300, and data transmitted between SSD controller 100 and host 900. The buffer memory can be included either inside or outside SSD controller 100. The buffer memory typically comprises a volatile memory, such as a DRAM or SRAM.

SSD controller 100 controls read, write, and erase operations of storage medium 300 and buffer memory. SSD controller 100 comprises logic elements for implementing control algorithms, such as buffer manager 30, scheduler 40 and FTL 50. These logic elements are typically implemented in software or firmware. SSD controller 100 manages mapping information of storage medium 300 using FTL 50 so that storage medium 300 can be used as a storage medium where a read, write, and erase operations can be performed similar to an SRAM or HDD. The mapping information of storage medium 300 is managed by FTL 50, and the results of specific mappings can be stored as metadata in storage medium 300.

SSD controller 100 classifies data in a buffer memory in volume and bank units, and distributes and stores the data based on the channel and way structures of flash memories 310 through 330 through buffer manager 30. SSD controller 100 performs scheduling so that data distributed to and stored in the buffer memory is distributed to the channels and ways of storage medium 300. As a result, data stored in the buffer memory is written in a plurality of flash memories corresponding to a plurality of channels and a plurality of ways in parallel. Consequently, the channel use and data storage performance of SSD 500 are improved.

In a read operation, during a data transmission period of a read command that is currently being executed, SSD controller 100 executes a data sensing period of a next read command. That is, the data sensing period of the next read command is executed in advance while a current command is being executed. As a result, the overall read efficiency of SSD 500 is improved.

In the example of FIG. 14, SSD controller 100 and storage medium 300 are incorporated in an SSD. However, in other embodiments, controller 100 and storage medium 300 may be incorporated in other types of devices, such as memory cards and/or memory card systems.

Where computing system 2000 is a mobile device, a battery 700 can be provided as a power supply. Although not shown, computing system 2000 can further comprise an application chipset, a camera image processor (CIS) or a mobile DRAM.

According to certain embodiments of the inventive concept, data can be distributed to and stored in a buffer memory based on a channel and way structure of a storage medium. The scheduling can be performed such that the data stored in the buffer memory can be distributed to and stored in parallel in a plurality of flash memories within the storage medium. As a result, channel use and data storage efficiency of the storage medium can be improved. In addition, in certain embodiments, the overall execution time of a plurality of successive read operations can be shortened to improve the read performance of a data storage device.

Certain embodiments of the inventive concept can be implemented as computer readable codes stored in a computer readable medium. The computer readable medium can be any data storage device capable of storing data and being read by a computer system. Examples of computer readable media include read-only memories, random-access memories, CD-ROMs, magnetic tapes, floppy disks, optical data storage devices, and carrier waves, such as data transmitted via the internet, to name but a few. Additionally, the computer readable media can also be distributed over network coupled computer systems so that the computer readable code is stored and executed in a distributed fashion.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A data storage device, comprising:
a plurality of memory devices connected to a plurality of channels and a plurality of ways;
a buffer memory that temporarily stores data to be written in the plurality of memory devices; and
a controller that stores the data in the buffer memory in a configuration determined by connections between the plurality of channels and the plurality of ways,
wherein the buffer memory comprises a plurality of sectors corresponding to a plurality of volumes and a plurality of banks, each volume in the plurality of volumes corresponding to a respective channel in the plurality of channels and each bank in the plurality of banks corresponding to a respective way in the plurality of ways, such that a logical address for each sector respectively corresponds to a cache line for one volume and one bank, and
the controller registers a write operation for data stored in a sector corresponding to the cache line in a corresponding one of the plurality of memory devices in a job unit, and queues the registered write operation with other job units to form a job unit plate.

2. The data storage device of claim 1, wherein the controller determines a volume and a bank of the buffer memory that correspond to a logical address of the data, and stores the data in a sector of the buffer memory corresponding to the determined volume and bank.

3. The data storage device of claim 1, wherein the controller stores the cache line and mapping information for a volume and a bank corresponding to the cache line.

4. The data storage device of claim 1, wherein the plurality of channels comprise N channels and the plurality of ways comprise M ways, and logical addresses of the buffer memory correspond to a plurality of cache ways, such that each of the cache ways comprises N×M cache lines corresponding to N volumes and M banks.

5. The data storage device of claim 4, wherein the controller controls data corresponding to at least one cache way to be stored in the plurality of memory devices.

6. The data storage device of claim 4, wherein the job unit plate comprises N×M job units corresponding to the N volumes and the M banks.

7. The data storage device of claim 1, wherein the controller executes write operations on the plurality of memory devices in a unit comprising at least one job unit plate.

8. The data storage device of claim 1, wherein each of the job units is queued in a location of the job unit plate based on a corresponding volume and bank.

9. The data storage device of claim 8, wherein the controller stacks a plurality of job units corresponding to the same volume and bank in the same location in different job unit plates for queuing operations.

10. The data storage device of claim 1, wherein the controller comprises a buffer memory control unit controlling write and read operations directed to the plurality of memory devices and further controlling the buffer memory, based on channel and way information for the plurality of memory devices.

11. The data storage device of claim 10, wherein the buffer memory control unit comprises:
a buffer manager that manages locations where the write data is stored in the buffer memory based on the channels and the ways; and
a scheduler that schedules timing for transferring the write data stored in the buffer memory into the plurality of memory devices.

12. The data storage device of claim 1, wherein the each one of the plurality of memory devices is one of a plurality of flash memory devices.

13. A method of storing data in a data storage device, comprising:
requesting a cache line of a buffer memory in response to a write command received from a host;
temporarily storing data in a free cache line upon determining that the free cache line exists in the buffer memory;
selecting a victim cache line and performing a flush operation on the victim cache line upon determining that no free cache line exists in the buffer memory;
defining a job unit corresponding to data from the flushed cache line;
queuing a plurality of job units to form a job unit plate having a data arrangement based on volume and bank information of the plurality of job units; and
performing a plurality of write operations in a plurality of memory devices connected to a plurality of channels and ways, the plurality of write operations corresponding to plurality of job units in the job unit plate.

14. The method of claim 13, further comprising:
performing a subset of the plurality of write operations in parallel in the plurality of channels.

15. The method of claim 13, wherein the plurality of channels correspond to a plurality of volumes of the buffer memory, and the plurality of ways correspond to a plurality of banks of the buffer memory.

16. A method of storing data in a data storage device including a plurality of memory devices connected to a plurality of channels and a plurality of ways, the method comprising:
temporarily storing write data to be written in the plurality of memory devices, and then re-storing the write data in a buffer memory according to a configuration determined by connections between the plurality of channels and the plurality of ways, wherein the buffer memory comprises a plurality of sectors corresponding to a plurality of volumes and a plurality of banks, each volume in the plurality of volumes corresponding to a respective channel in the plurality of channels and each bank in the plurality of banks corresponding to a respective way in the plurality of ways, such that a logical address for each sector respectively corresponds to a cache line for one volume and one bank;
registering a write operation for write data stored in a sector corresponding to the cache line in a corresponding one of the plurality of memory devices in a job unit; and then,
queuing the registered write operation with other job units to form a job unit plate.

17. The method of claim 16, further comprising:
determining a volume and a bank of the buffer memory that correspond to a logical address of the data; and
storing the write data in a sector of the buffer memory corresponding to the determined volume and bank.

18. The method of claim 16, further comprising:
storing cache line and mapping information for a volume and a bank corresponding to the cache line.

19. The method of claim 16, wherein the plurality of channels comprises N channels and the plurality of ways comprises M ways, and logical addresses for the buffer memory correspond to a plurality of cache ways, such that each of the cache ways comprises N ×M cache lines corresponding to N volumes and M banks.

20. The method of claim 19, wherein the job unit plate comprises N ×M job units corresponding to the N volumes and the M banks.

21. The method of claim 16, further comprising:
executing write operations directed to the plurality of memory devices in a unit comprising at least one job unit plate.

22. The method of claim 16, wherein each of the job unit is queued in a location of the job unit plate based on a corresponding volume and bank.

23. The method of claim 22, further comprising:
stacking a plurality of job units corresponding to the same volume and bank in the same location in different job unit plates during queuing operations.

* * * * *